Oct. 16, 1923.
J. E. MEED
1,470,693
COMBINED COVER AND SPOUT FOR VESSELS
Original Filed March 22, 1921
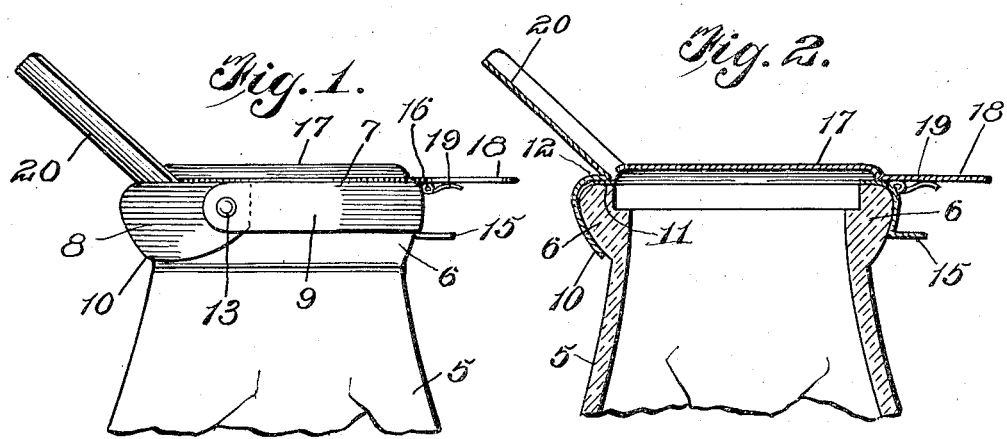
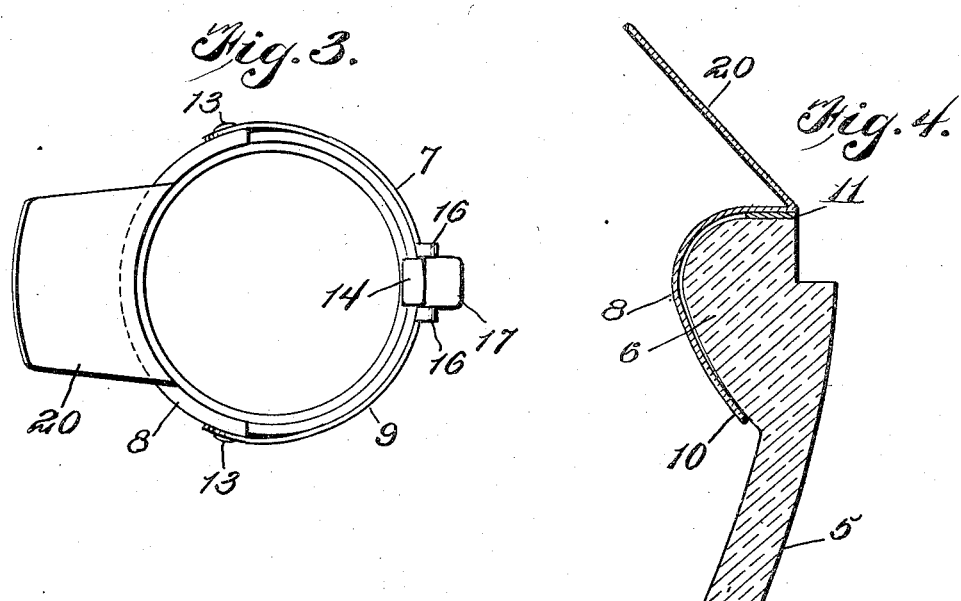
Inventor:
James E. Meed,
By C. C. Hines,
Attorney.

Patented Oct. 16, 1923.

1,470,693

UNITED STATES PATENT OFFICE.

JAMES E. MEED, OF PALESTINE, WEST VIRGINIA.

COMBINED COVER AND SPOUT FOR VESSELS.

Application filed March 22, 1921, Serial No. 454,474. Renewed September 27, 1922. Serial No. 590,997.

*To all whom it may concern:*

Be it known that I, JAMES E. MEED, a citizen of the United States, residing at Palestine, in the county of Wirt and State of West Virginia, have invented new and useful Improvements in Combined Covers and Spouts for Vessels, of which the following is a specification.

This invention relates to combined covers and spouts for vessels, the device of my invention being adapted particularly for use in connection with containers or vessels such as milk bottles, the primary object of the invention being to provide a closure member which may be quickly and easily applied to the open end of the bottle to normally maintain the same closed and sealed against the entrance thereto of flies or other insects, and which provides a pouring lip or spout to facilitate emptying the contents of the bottle without waste or dripping and without permitting the contents of the bottle to run down the outer side thereof.

A further object of the invention is to provide a device of the character thus generally stated which may be readily operated to open the bottle when it is desired to pour the contents therefrom, and which is constructed in such manner that when the bottle is righted after the pouring operation any drops or particles clinging to the spout will run back into the bottle and thus be saved.

A still further object of the invention is to provide means of a novel nature for securing the combined cover and spout devices to the bottle mouth, the construction of all the parts being such that they may be readily cleaned and maintained at all times in sanitary conditions, the benefits of which are very apparent.

With these and other objects in view, the invention consists of the features of construction, combination and arrangement of parts, hereinafter fully described and claimed, reference being had to the accompanying drawing, in which:

Figure 1 is a side elevation of the top portion of a conventional form of milk bottle and illustrating the device of my invention applied thereto, Figure 2 is a vertical sectional view taken through the milk bottle and combined spout and cover therefor, Figure 3 is a top plan view of the bottle and a portion of the device attached thereto, the cover per se being removed, and Figure 4 is an enlarged detail sectional view taken through a portion of the bottle neck and illustrating the manner in which the securing rim is attached thereto.

The device of my invention as shown in the present instance is applicable particularly to milk bottles, but while the invention is designed particularly for use with such containers, it is not to be considered as limited to such use, as by possible changes in the construction and proportion of some of the parts it may be rendered applicable to other types, sizes and styles of dispensing vessels.

In the drawing 5 represents the neck portion of the milk bottle and 6 is the bead around the mouth thereof. The spout and top portions of the device are to be attached to the extreme upper end of the bottle, and to facilitate its attachment, to enable the device to be readily applied to or removed from the bottle neck, and to securely hold the device upon the bottle, an engaging member in the form of an annulus represented generally at 7 is provided. This annulus is adapted to engage around the bead 6 of the bottle neck, and in the present instance is formed of a pair of arcuate sections 8 and 9 respectively. These sections are formed of thin metal of any desired kind, and the section 8, which forms a body member or spout carrying member, is provided with a downwardly and inwardly extending flange 10 to engage and snugly fit against the under surface of bead 6, while the upper portion of this section is provided with a flange 12 which extends inwardly over the top of the bottle bead and carries a washer 11 on its under surface to rest upon the top edge of the bottle. The inner edge of inwardly extending flange 12 of this section terminates preferably flush with the opening of bottle 5, and the said flange is coextensive with the section 8. The section 9 of the annulus, which serves as a clamping member is formed of suitable strap metal and engages at its ends in overlapping relation with the adjacent ends of the section 8, the said overlapping ends being pivoted together as at 13. It will be noted that the pivotal connection 13 is disposed to one side of the vertical center of the bottle, the section 9 being of greater length than section 8. The section 9 is provided intermediate its ends and upon its upper edge with an inwardly extending lug 14 to engage with the upper edge of the bottle and limit the downward swinging movement of the said section, while an outwardly projecting lug 15 is formed on the lower edge of the section 9 intermediate the ends thereof and acting as a thumb or finger grip to facilitate adjustment of the annulus upon the bottle neck.

Extending outwardly from section 9 in spaced parallel relation intermediate the ends of the said section are apertured ears 16, to which is hingedly connected one edge of the cap or cover indicated at 17. This cover is provided at one edge with a rearwardly projecting grip member or thumb hold 18, against the under surface of which bears one end of a spring 19, the latter yieldingly holding the cover in closed position over the bottle mouth. This cap 17 is of such size as to completely cover the open end of the bottle and rests at its edges snugly upon the latter.

The annulus section 8 is provided with an upwardly and outwardly extending spout 20 which connects with the section 8 at the inner upper edge thereof, and is therefore substantially flush with the edge of the bottle mouth. The extreme forward edge of cap or cover 17 is cut away as shown particularly at 17' in Figure 2 of the drawing, to permit of drops of fluid upon the spout 20 running back into the bottle after the latter is righted.

It is believed that the operation of the device will be obvious, and in applying the annulus to the bottle neck, the section 8 thereof is first adjusted to the bead 6 of the bottle, the flanges 10 and 12 thereof being engaged with the bead as shown in Figures 2 and 4. The pivoted section 9 is then swung downwardly until the intermediate portion thereof frictionally engages with the curved end portion of bead 6, and in order that a tight fit of the annulus to the bottle may be assured, the former is made a trifle smaller in diameter than the exterior portion of the bottle bead. The downward swinging movement of pivot section 9 is limited by the inwardly projecting lug 14, the latter resting upon the upper edge of the bottle. The cover or cap 17 may be swung to operative position by applying downward pressure upon the rearwardly projecting thumb hold 18, as is obvious, and the release of this pressure will permit spring 19 to force the cover to closed position.

From the foregoing it is obvious that I have provided a combined spout and cover for vessels such as milk bottles which will prove thoroughly practical in use and which will fully attain the objects set forth.

Having thus fully described my invention, I claim:

1. In a device of the character described, a body member adapted to embrace a portion of the neck of a bottle, a clamping member hinged to said body member and adapted to embrace the remainder of the neck of the bottle and clamp itself and said body member thereto, a pouring lip carried by said body member, and a cover pivotally mounted upon the clamping member for closing the mouth of the bottle.

2. In a device of the character described, the combination with a bottle having a beaded mouth, of a body member formed to embrace a portion of the bead, said body member having upper and lower flanges to respectively overhang the rim of the bead and extend under the base of said bead, a clamping member pivotally connected with said body member and adapted to be forced downward to embrace the remainder of the bead to clamp itself and said body member thereto, a pouring spout carried by the body member, and a cover pivotally mounted upon the clamping member to close the mouth of the bottle.

3. In a device of the character described, an annulus adapted to embrace the mouth of a bottle, said annulus comprising a body member and a clamping member for clamping itself and said body member to the bottle mouth, a pouring spout carried by the body member, a cover pivotally mounted on the clamping member and having a portion cut away to leave a space, when said cover is in closed position, between it and said pourings pout, said cover being provided with a finger piece for manipulating it, and a finger piece upon the clamping member for swinging it into and out of clamping position.

4. In a device of the class described, the combination with the beaded mouth of a bottle, of a body member adaptable to said mouth, retaining means on said body member to engage the beaded portion of said mouth retaining the same in position, one edge of said body member terminating flush with the bottle mouth, a clamping member carried by the body member and alined with the edge of said mouth, and a cover carried by the body member.

5. In a combined vessel cover and spout of the class described, an annulus comprising a pair of arcuate sections pivoted together at their ends, one of said sections being of greater length than the other, a lip carried by the shorter annulus section, a lug projecting inwardly from the upper edge of the longer annulus section, said lug being adapted to engage a portion of the vessel to limit the closing movement of the longer annulus section, and a cover hingedly connected at one side to said other section, the free edge of said cover being cut away so as to be spaced from the inner edge of the smaller of said sections.

In testimony whereof I affix my signature.

JAMES E. MEED.